(No Model.)

J. P. GRUBER.
FILTER.

No. 353,855. Patented Dec. 7, 1886.

WITNESSES:
E. B. Bolton
Frank Moulin

INVENTOR:
John P. Gruber
By his Attorney,
Henry Connett

N. PETERS, Photo-Lithographer, Washington, D. C.

UNITED STATES PATENT OFFICE.

JOHN P. GRUBER, OF JERSEY CITY, NEW JERSEY.

FILTER.

SPECIFICATION forming part of Letters Patent No. 353,855, dated December 7, 1886.

Application filed August 13, 1886. Serial No. 210,767. (No model.)

*To all whom it may concern:*

Be it known that I, JOHN P. GRUBER, a citizen of the United States, and a resident of Jersey City, in the county of Hudson and State of New Jersey, have invented certain Improvements in Filters, of which the following is a specification.

My invention relates to that class of filters which have a diaphragm through which the liquid to be filtered may be made to pass in either direction by the manipulation of a cock or cocks.

The object of my invention is, in part, to provide a means for flushing the filter for cleansing the diaphragm, which is apt to become foul with sediment, and in part to provide guards or stops to prevent the swelling out or bulging of the diaphragm when under pressure. In order to improve the facilities for flushing, I provide the two chambers of the filter each with an outlet and introduce the liquid centrally and discharge it directly against the face of the diaphragm. This liquid flows off directly at the outlet from the chamber flushed, and does not pass through the diaphragm of the filter. The guards to protect the diaphragm against distention and distortion are peculiarly arranged, as will be hereinafter described, with a view to avoid impeding the flow or passage of the liquid through the diaphragm, and are not normally in contact with the diaphragm.

My invention will be fully described hereinafter, and its novel features carefully defined in the claims.

Figure 1:
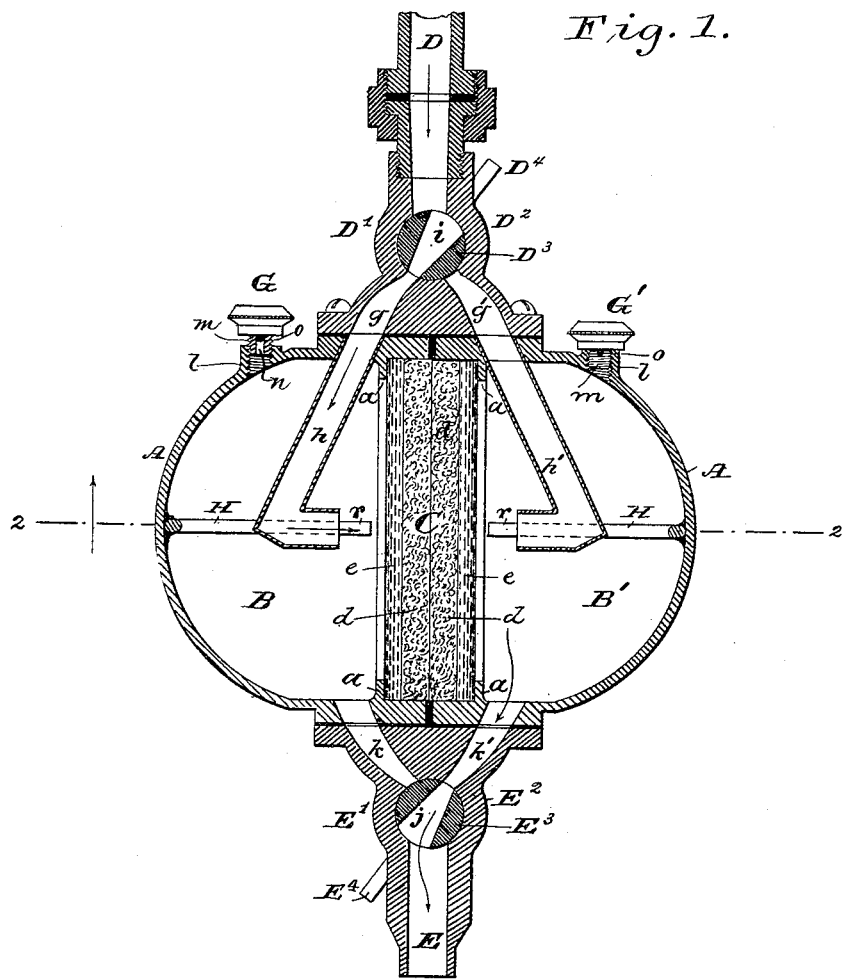
Figure 2:
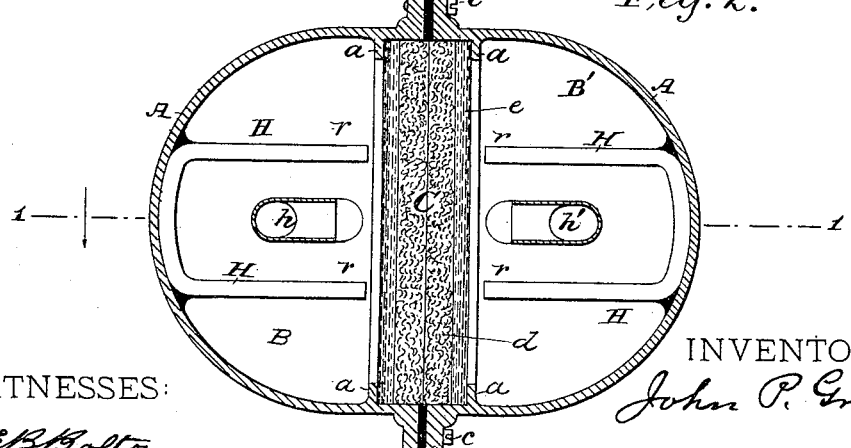

In the drawings which serve to illustrate my invention, Figure 1 is a vertical mid-section of the filter, taken at right angles to the axes of the cock-plugs, in the plane indicated by line 1 1 in Fig. 2; and Fig. 2 is a horizontal section taken in the plane indicated by the line 2 2 in Fig. 1.

The body of the filter, which may be of any shape, is formed of two like flanged sections, A A, forming, when secured together, two chambers, B B', separated by a filtering diaphragm or partition, C, clamped between or held in place by internal flanges, *a a*, formed, respectively, on the two sections A A. These sections are provided, for convenience of securing them together, with external flanges, *b b*, (seen in Fig. 2,) which receive securing-screws *c c*.

The filtering diaphragm is or may be composed of two sheets of thick felt, *d d*, embraced between sheets of wire-gauze *e e*, of different degrees of fineness—that is to say, the outer sheets on each side may be comparatively coarse in texture, the next sheets finer in texture, and the sheets next the felt very fine in texture. This is the way I prefer to construct the diaphragm; but any material or materials may be employed for the diaphragm that will properly filter the liquid, and of course the choice of material used will be governed to some extent by the character of the liquid to be filtered.

As herein shown, my filter is particularly well adapted for filtering water from cocks and hydrants under the usual pressures from the city mains.

D is the inlet of the filter, and E the outlet.

D' is a two-way inlet-cock, and E' is a two-way outlet-cock. The cock D' controls two ports forming the mouths of two passages, *g* and *g'*, opening, respectively, into chambers B and B' through inlet-pipes *h* and *h'*. The passages *g g'* are formed in the shell $D^2$ of cock D', and said shell has a flanged base, whereby it is secured to the body of the filter. The plug $D^3$ of cock D' has a cross port, *i*, which is always open to inlet D, and may be made to register with either of the ports opening into passages *g g'*. This plug has the usual cross-handle, $D^4$, a part of which is seen in Fig. 1, and I usually provide it with stops of a well known kind, to limit its oscillatory movement in both directions.

The outlet-cock E' is, or may be, an exact counterpart of the inlet-cock D'. In its shell $E^2$ is mounted a plug, $E^3$, provided with a cross-port, *j*, and a cross-handle, $E^4$. The cock E' controls the flow of the liquid from chambers B and B' through passages *k* and *k'*, respectively, and port *j* in the plug is always open at its wider end to the outlet E.

The inlet-pipes *h h'* have their nozzles arranged with their axes perpendicular to the diaphragm, and are arranged to discharge the liquid centrally directly against the diaphragm C, to facilitate washing the sediment therefrom in flushing.

So far as described the operation is as follows: When the cock-plugs $D^3$ and $E^3$ are turned as represented in Fig. 1, the liquid, entering at inlet D, flows through port $i$ in plug D³, through passage $g$, and through pipe $h$ to chamber B; thence, under pressure, it passes through the filtering-diaphragm C to chamber B', and out through passage $k'$, port $j$ in plug E³, and outlet E, being thoroughly filtered in its passage. When sediment accumulates in chamber B, and on that side of the filtering-diaphragm, said chamber may be thoroughly and quickly flushed or washed out by turning the plug of outlet-cock E' until port $j$ coincides with passage $k$, when the liquid will flow directly through chamber B. When it is desired to reverse the course of the liquid and compel it to pass through the diaphragm C in the opposite direction, the inlet and outlet cocks are both shifted. The liquid then flows first into chamber B', and then through the diaphragm to chamber B. If it be desired to shut off the liquid entirely, the cock-plug E³ is turned until the smaller end of port $j$ stands between the mouths of passages $k$ and $k'$.

In setting the filter in operation, and from time to time when needed, the air may be allowed to escape at the upper parts of chambers B and B' by means of plug-valves G G', one for each chamber. These are precisely alike, and I need only describe one. In an internally-screw-threaded outlet, $l$, is screwed a plug, $m$, which has a passage, $n$, extending in from its inner end, and connecting with a lateral aperture, $o$, in the plug. When the plug $m$ is unscrewed far enough to uncover aperture $o$, the air may escape from the chamber by way of said aperture and passage $n$. The valve G is shown in section and open, and the plug $m$ of valve G' in elevation and the plug screwed down tight.

The pressure on one side of the diaphragm, especially if long continued, is apt to bulge it out or give it a convex form on the opposite side. To obviate this I provide a support or stop—one in each chamber—to prevent too much play of the diaphragm under these conditions. I usually employ, as a simple form of stop, a bent rod, H, secured to the inner wall of the chamber, and its ends $r\ r$ arranged to stand adjacent to the diaphragm C, but a little out of contact. I employ for this purpose the guard or stop illustrated, which comprises the bent staple-like rod H, secured to the inner wall of the chamber and its prongs arranged to stand with their ends $r\ r$ in close proximity to the diaphragm C, but not in contact therewith. The nozzle of the inlet-pipe $h$ stands between these prongs.

Having thus described my invention, I wish to say that I do not claim the construction whereby the liquid may be made to pass through the filter in both directions or be made to pass directly through either chamber without passing through the filtering-diaphragm, as this is old in filters; nor do I claim the particular construction of the diaphragm as described, nor the air-outlet on the chamber, as these features are not new with me; but I am not aware of any filter having a partition-diaphragm and two inlets and outlets on the opposite sides of said diaphragm, and wherein the inlet-nozzles are both constructed and arranged to discharge directly upon or against the diaphragm on opposite sides, as herein described.

What I claim as my invention is—

1. The combination of the filter-body A, having two chambers, B B', the filtering-diaphragm C between and separating said chambers, the two inlet-pipes $h\ h'$, arranged, respectively, in chambers B B', the discharge-nozzles of said pipes being arranged with their axes perpendicular to said diaphragm, the two-way inlet cock D', controlling the inlets to chambers B B', and the two-way outlet-cock E', controlling the outlets from said chambers, as set forth.

2. The combination, in a filter, of the two sections forming the body of the filter, the filtering-diaphragm constructed of layers of filtering material and clamped between and held by flanges on the said sections of the body, and the two staple-like guards H H, one in each chamber, secured to the filter body, and the ends $r\ r$ of their prongs arranged in proximity to but out of contact with the respective faces of said diaphragm, as set forth.

3. The combination, in a filter, of the hollow body A, divided into two chambers, B B', by a filtering-diaphragm, C, constructed of layers of flexible filtering material clamped and held by flanges on the filter-body, the said diaphragm, the two guards or stops H, one in each chamber, secured to the body, and their ends arranged close to but out of contact with the faces of the diaphragm, the two angular inlet-pipes $h\ h'$, one in each chamber, with their nozzles arranged between the prongs of the guards H, and the axes of said nozzles arranged perpendicular to the faces of said diaphragm, the two-way inlet-cock D', and the two-way outlet-cock E', as set forth.

In witness whereof I have hereunto signed my name in the presence of two subscribing witnesses.

JOHN P. GRUBER.

Witnesses:
 HENRY CONNETT,
 FRANK MOULIN.